US006758786B2

(12) United States Patent
Lepelletier (10) Patent No.: US 6,758,786 B2
(45) Date of Patent: Jul. 6, 2004

(54) INTEGRATED ASSEMBLY COMPRISING A HYDRAULIC CLUTCH AND A PLANETARY GEAR TRAIN, IN PARTICULAR FOR AUTOMATIC TRANSMISSION PARTICULARLY OF VEHICLES, AND AUTOMATIC TRANSMISSION COMPRISING SAME

(75) Inventor: Pierre Lepelletier, Chatou (FR)

(73) Assignee: SC Brevets Lepelletier, Chatou (FR)

( * ) Notice: Subject to any disclaimer, the term of this patent is extended or adjusted under 35 U.S.C. 154(b) by 0 days.

(21) Appl. No.: 10/169,905

(22) PCT Filed: Jan. 3, 2001

(86) PCT No.: PCT/FR01/00020

§ 371 (c)(1),
(2), (4) Date: Jul. 11, 2002

(87) PCT Pub. No.: WO01/51831

PCT Pub. Date: Jul. 19, 2001

(65) Prior Publication Data

US 2003/0087720 A1 May 8, 2003

(30) Foreign Application Priority Data

Jan. 12, 2000 (FR) .......................................... 00 00327

(51) Int. Cl.[7] ................................................ F16H 3/44
(52) U.S. Cl. ................................... 475/296; 192/106 F
(58) Field of Search ...................... 192/106 F; 475/296

(56) References Cited

U.S. PATENT DOCUMENTS

| | | | |
|---|---|---|---|
| 2,399,097 A | | 4/1946 | Carnagua |
| 2,795,972 A | | 6/1957 | Cavallier |
| 4,732,253 A | * | 3/1988 | Hiramatsu et al. ........ 192/87.11 |
| 4,957,195 A | * | 9/1990 | Kano et al. .............. 192/106 F |
| 5,700,221 A | | 12/1997 | Mizuta |
| 5,865,289 A | * | 2/1999 | Ishimaru ................... 192/87.11 |
| 6,071,208 A | * | 6/2000 | Koivunen .................... 475/275 |
| 6,213,907 B1 | * | 4/2001 | Wooden ..................... 475/216 |
| 6,358,178 B1 | * | 3/2002 | Wittkopp .................... 475/207 |

FOREIGN PATENT DOCUMENTS

| | | |
|---|---|---|
| DE | 196 31 548 | 1/1997 |
| JP | 09004655 | 1/1997 |

* cited by examiner

*Primary Examiner*—Dirk Wright
(74) *Attorney, Agent, or Firm*—Young & Thompson (57) ABSTRACT

A hydraulic clutch and a speed reducing planetary gear train, with an assembly comprising a fixed feeder block, a rotating crankcase integral with a feeder sleeve receiving at least a piston, a so-called closure wall and at least a set of friction discs for driving at least an output hub and a speed reducing planetary gear train, and a including a ring gear designed to be driven by an input shaft, a fixed axle pinion, and a planet pinion cage. The closure wall is made integral in rotation with the feeder sleeve and the crankcase and directly driven by the planet pinion cage.

14 Claims, 6 Drawing Sheets

INTEGRATED ASSEMBLY COMPRISING A HYDRAULIC CLUTCH AND A PLANETARY GEAR TRAIN, IN PARTICULAR FOR AUTOMATIC TRANSMISSION PARTICULARLY OF VEHICLES, AND AUTOMATIC TRANSMISSION COMPRISING SAME

The present invention addresses itself to the field of components for planetary type automatic transmissions typically used in automotive vehicles, and making use of planetary gear sets controlled by friction elements such as hydraulic clutches and brakes.

For a long period automatic transmissions used in automotive vehicles have had only three speeds, then they offered four, and in the last few years a tendency has been observed to go to five speeds in order to satisfy a customer need which first appeared in the top end of the market and is now extending to medium size vehicles. Some manufacturers are now even looking at offering six speed automatic transmissions.

In an effort to meet that need, manufacturers have generally designed transmissions which use several clutches located directly on the transmission input shaft or clutches positioned in such a way that they drive several transmission members at input speed.

In order to optimize these transmissions, it has been proposed, for instance in document EP-A-0 434 525, to drive two transmission members not at input speed but at a reduced speed.

The present invention proposes to reduce the bulk of these transmissions particularly in the axial direction.

The object of this invention is an integrated assembly comprising a hydraulic clutch and a speed reducing planetary gear set, said assembly including, on one hand, a stationary oil supply bush, a rotating casing integral with an oil supply sleeve receiving at least one piston, a partition called end partition, and at least one set of friction discs so as to drive at least one friction hub, and, on the other hand, a speed reducing planetary gear set including a ring gear to be driven by an input shaft, a stationary sun gear and a planet pinion carrier, characterized by the fact that the end partition is fixed for rotation with the oil supply sleeve and with the casing, and that it is driven directly by the planet pinion carrier.

Preferably the planet pinion carrier is assembled directly on the end partition and the sun gear is held stationary in rotation directly by the stationary oil supply bush.

Advantageously the planet pinions rotate on shafts which have extensions fitted in bores machined in the end partition and contributing in transmitting torque between the planet pinion carrier, the end partition, the oil supply sleeve and the rotating casing.

Preferably the end partition and the piston define a centrifugal pressure compensation chamber between themselves.

Advantageously the shafts of the planet pinions are crossed by longitudinal channels for the lubrication of the planetary gear set which are parallel to the shafts and open in the centrifugal compensation chamber.

Preferably the lubrication channels provided for in the shafts of the planet pinions ensure the lubrication of the planetary gear set as well as the supply of oil to the compensation chamber.

Advantageously the centrifugal compensation chamber is supplied with oil coming through channels provided for in the stationary oil supply bush and in the oil supply sleeve.

Advantageously the oil supply channels provided for in the stationary oil supply bush and in the oil supply sleeve provide oil to the compensation chamber as well as lubrication for the planetary gear set.

Preferably the end partition is also fixed for translation with the rotating casing; the end partition consists of three elements i.e. a first element in the shape of a hub having splines engaged in corresponding splines of the oil supply sleeve, a second element in the shape of a nut having a threaded part engaged in a corresponding thread of the oil supply sleeve, and a third element in the shape of a piston having an oil-tight seal and engaged in the piston the first and second elements of the end partition are assembled by screws.

Advantageously, two axial bearings are mounted, one between the sun gear and the planet pinion carrier, the other between the planet pinion carrier and the ring gear so as to ensure simultaneously the necessary clearances between the sun gear, the planet pinion carrier and the ring gear and the axial position of the whole assembly; an intermediate spacer is set between the stationary oil supply bush and the sun gear and is used to adjust the axial position of the whole assembly.

The object of the present invention is also an automatic transmission, more particularly for vehicles, including an integrated assembly such as the one described above.

The characteristics and advantages of the invention will moreover appear clearly in the following description as examples in reference to the attached drawings in which.

Figure 1:
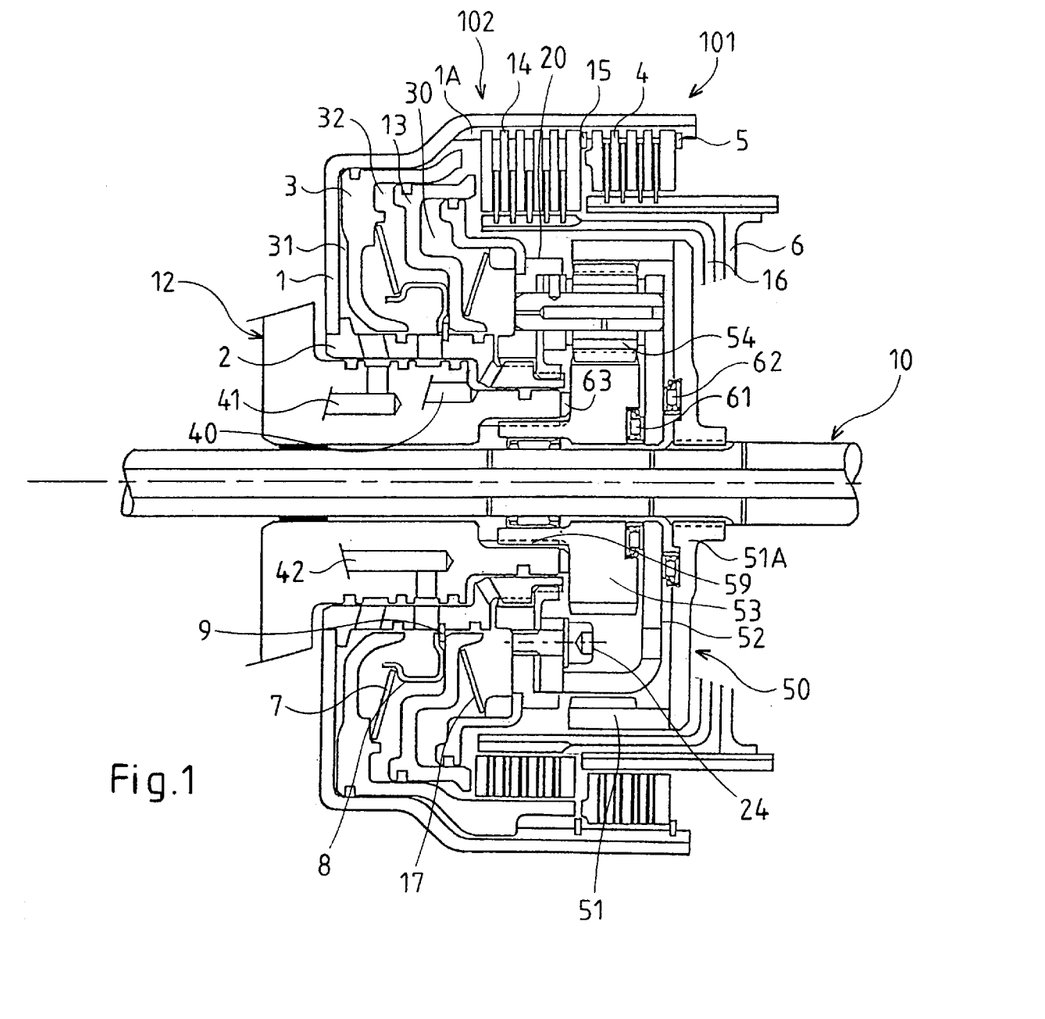
FIG. 1 shows a first embodiment of the invention with a double clutch formed of two overlapping single clutches working in series, FIGS. 2 and 3 give several details as a complement to FIG. 1.
Figure 2:
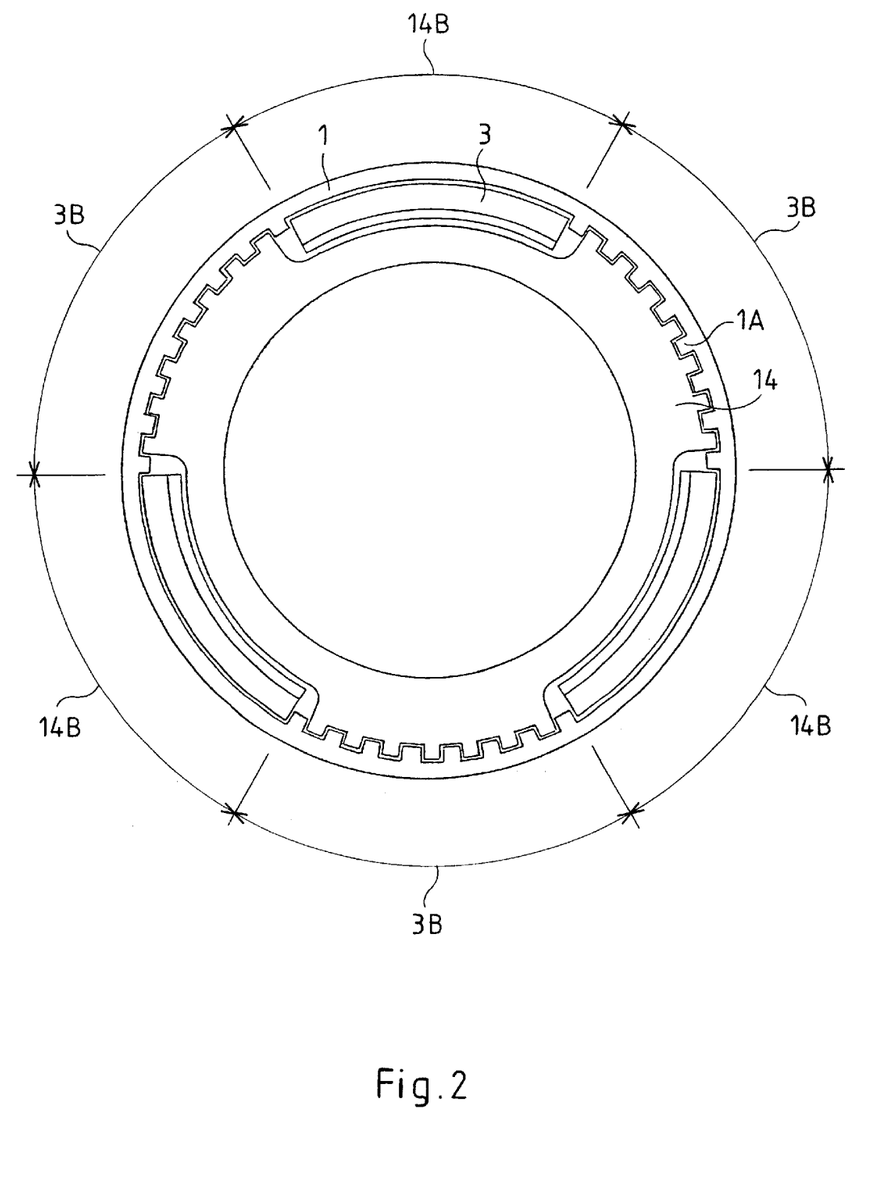
Figure 3:
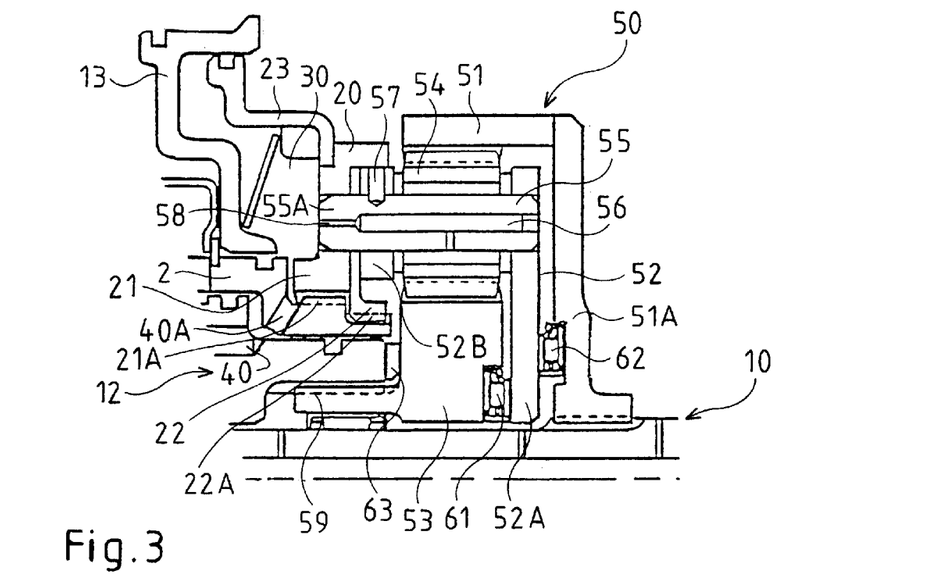

Referring to FIGS. 1 to 3, one can see a double clutch connected to an input shaft 10, a stationary oil supply bush 12, a first 101 and a second 102 overlapping clutches and a speed reducing planetary gear set 50.

According to a first characteristic of the invention, the first clutch 101 includes a rotating casing 1 having splines 1A fixed to a rotating oil supply sleeve 2 and a first piston 3 engaged in casing 1, in sleeve 2 and in splines 1A, operating with a first set of friction discs 4 engaged in splines 1A and stopped by a snap-ring 5 so as to drive a first friction hub 6. A spring washer 7 bearing on a cage 8 stopped by a snap-ring 9 returns piston 3 against casing 1.

The second clutch 102 includes a second piston 13 engaged in first piston 3 and in sleeve 2 operating with a second set of friction discs 14 engaged in splines 1A and stopped by a snap-ring 15 so as to drive a second friction hub 16. A spring washer 17 bearing on a stop 20 in the shape of a partition, called end partition, returns piston 13 against snap-ring 9; this partition 20 is engaged here in piston 13, equipped with an oil-tight seal installed so as to create a centrifugal shield, and stopped axially in sleeve 2. According to the detail of FIG. 2, piston 3 and disc-set 14 show alternated radial gaps 3B and 14B set at intervals on their circumference so as to let piston 3 act freely on disc-set 4, and similarly to let disc-set 14 act freely on hub 16.

Casing 1 and piston 3 form a first hydraulic chamber 31, piston 3 and piston 13 form a second hydraulic chamber 32, and piston 13 with partition 20 form a centrifugal pressure compensation chamber 30. Oil supply channels 41, 42, 40, 40A provided for in stationary bush 12 and in rotating sleeve 2 make it possible to supply oil independently to chamber 31 under pressure P1, to chamber 32 under pressure P2 lower than P1, and to compensation chamber 30 under pressure P0, this last pressure being generally low such as for instance a lubrication oil pressure and lower than P1 and P2. Seals are installed so as to make the chambers oil-tight.

Piston 3 of clutch 101 reacts to pressure P1–P2 and piston 13 of clutch 102 reacts to pressure P2–P0, thus defining a series type control of the two clutches. When rotating, centrifugal forces are balanced on each side of piston 3 and of piston 13, so as to eliminate any interfering influence of speed.

Speed reducing gear set 50 includes a ring gear 51 held on a splined hub 51A driven by input shaft 10, a sun gear 53 held stationary, and a planet pinion carrier 52 driven at the reduced speed required for clutches 101 and 102. Planet pinion carrier 52 is composed of a cage 52A extending to the proximity of the center and of a closing flange 52B, holding together a group of planet pinions 54 assembled on shafts 55 fitted in corresponding bores. Shafts 55 are provided with lubrication channels 56 connected to a lubrication circuit not shown and specific to the planetary gear set, and held in position by any adequate means and for example by split pins 57 pressed in flange 52B. A first axial bearing 61 maintains clearance between sun gear 53 and planet pinion carrier cage 52A, and a second axial bearing 62 maintains clearance between planet pinion carrier cage 52A and hub 51A holding ring gear 51.

End partition 20 consists of three elements : a first element 21 in the shape of a hub having splines 21A engaged in corresponding splines of oil supply sleeve 2, a second element 22 in the shape of a nut having a threaded part 22A engaged similarly in a corresponding thread of oil supply sleeve 2, and a third element 23 in the shape of a piston and bearing an oil-tight seal and engaged in piston 13. Elements 21 and 22 are assembled to each other by any adequate means and for example by screws 24, and in such a way that oil passage between element 21 and sleeve 2 is kept in the area of oil supply channels 40, 40A. End partition 20 is thus locked in rotation and translation with casing 1, and oil supply to chamber 30 is ensured.

Planet pinion carrier 52 of planetary gear set 50 is secured directly on end partition 20 by any adequate means and for example by screws 24, and sun gear 53 is splined in stationary oil supply bush 12 by splines 59 stopping it in rotation, and bears on an intermediate washer 63 of appropriate thickness.

Thus is achieved a particularly compact centrifugally compensated double clutch/speed reducing planetary gear set integrated assembly, in which axial bearings 61 and 62 not only maintain clearances between sun gear 53, planet pinion carrier 52 and ring gear 51 of the planetary gear set, but also axially locate rotating sleeve 2 and the whole clutch, whereas intermediate washer 63 determines the axial location of the assembly.

According to a second characteristic of the invention, planet pinion shafts 55 have extensions 55A fitted in corresponding bores in end partition 20. As a result of this construction, torque is transmitted from planet pinion carrier 52 to rotating casing 1 and inversely through end partition 20 and rotating sleeve 2 directly through planet pinion shafts 55 and no longer only through fixing screws 24.

According to a third characteristic of the invention, lubrication channels 56 for the planet pinion shafts 55 are designed to communicate with centrifugal compensation chamber 30 through oil passages 58, making it possible to feed chamber 30 and to lubricate planetary gear set 50 from a single common oil supply. This common supply may be either that of chamber 30 through oil supply channels 40, 40A and their extension between sleeve 2 and element 21 of partition 20, and in this case the lubrication circuit specific to planetary set 50 can be omitted, or the lubrication circuit specific to planetary set 50, and in this case oil supply channels 40, 40A and their extension to chamber 30 can be omitted.

With regard to input shaft 10, it will be noted that assembly 101, 102 according to the invention features a highly minimized inertia, proportionally to the square of the speed reduction ratio, which in all cases and particularly in automotive automatic transmissions brings a great advantage.

Similarly, it will be noted that the centrifugal forces seen separately by each of the two clutches 101, 102 are reduced in the same proportion which, along with the centrifugal force hydraulic compensation already achieved, eliminates even more completely any possibility of an interfering influence of speed, and brings another important advantage.

Finally, it will be noted that the construction according to the invention is such that these very important advantages keep their full value over a very wide spectrum of utilization.

Figure 4:
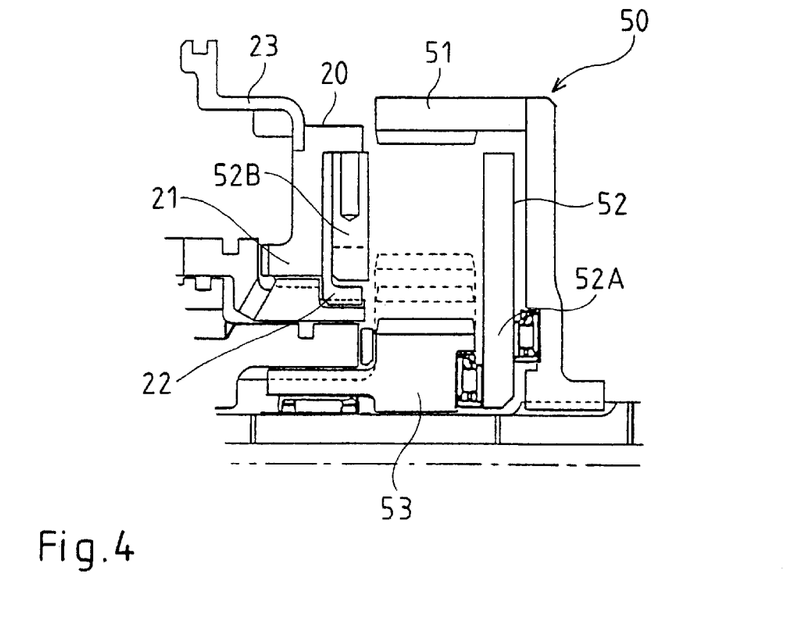
FIG. 4 shows the large potential for ratio change of the planetary gear set, with no modification of its general construction.

In that respect, FIG. 4 shows planetary gear set 50, ring gear 51, cage 52A and flange 52B of planet pinion carrier 52, sun gear 53, and the three elements 21, 22, 23 of end partition 20. As an example, and for a given dimension of ring gear 51, several possible dimensions of sun gear 53 have been added in dotted lines, clearly to be followed by half distance displacements of the planet pinion shafts 55 in the cage 52A and the flange 52B. The only necessary modifications in end partition 20 are the location of the bores to meet extensions 55A of shafts 55, and eventually the locations of screws 24.

Table 1 below shows the impressive centrifugal force and inertia reduction thus achieved, as a function of the sun gear/ring gear ratio. Speed reduction is given as a ratio of input speed taken as unity.

TABLE 1

| Sun gear 53/Ring gear 51 ratio | 0.42 | 0.47 | 0.52 | 0.57 | 0.62 |
|---|---|---|---|---|---|
| Input speed (unity) | 1 | 1 | 1 | 1 | 1 |
| Speed reduction | 0.71 | 0.68 | 0.66 | 0.64 | 0.62 |
| Centrifugal force and inertia reduction | 50% | 54% | 57% | 59% | 62% |

In the case of a ring gear 51 having for instance 79 teeth, the dimension ratios used in the table above correspond to sun gears 53 having respectively 33 teeth, 37 teeth, 41 teeth, 45 teeth and 49 teeth.

Figure 5:
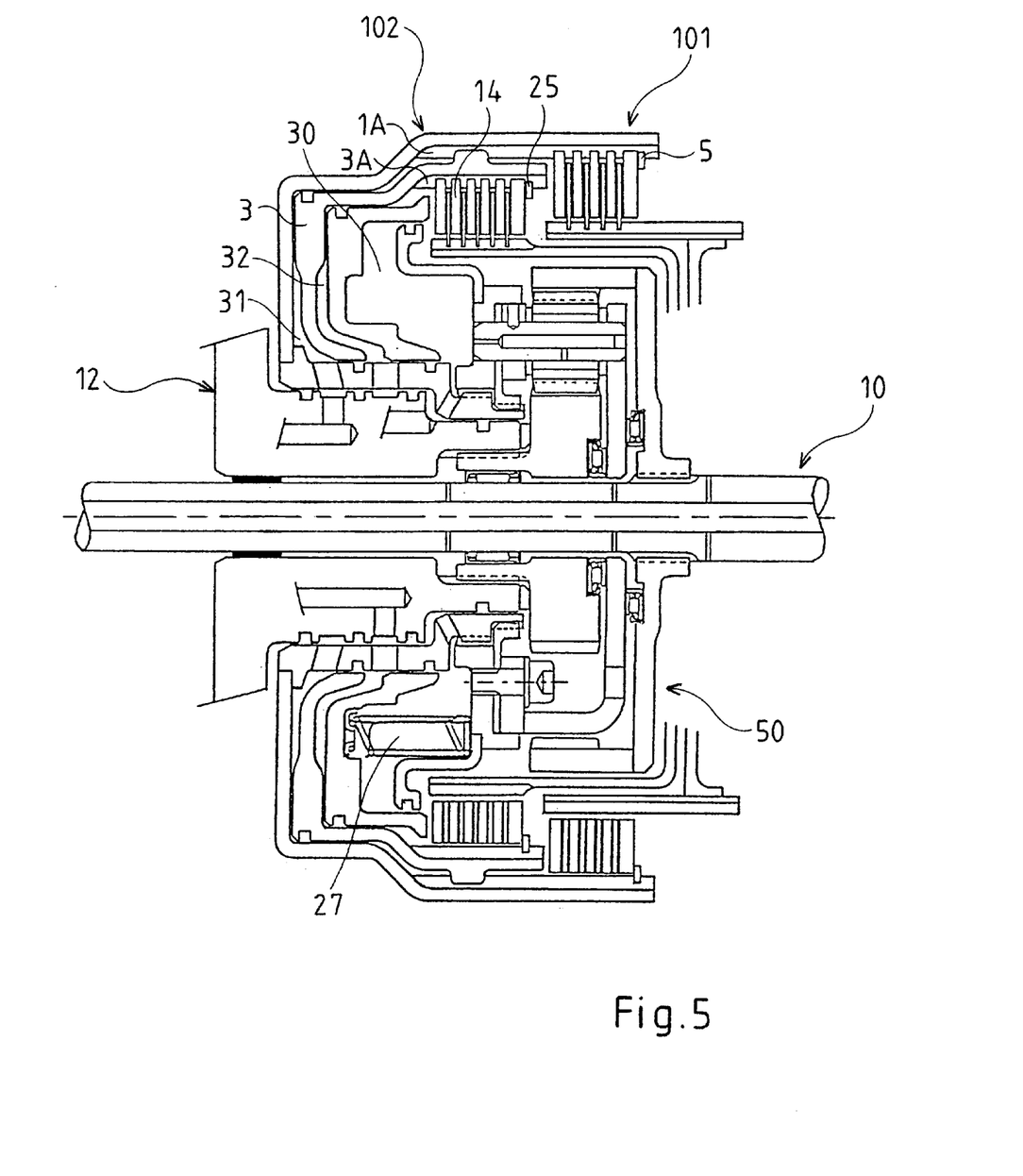
FIG. 5 shows a second embodiment of the invention with a double clutch formed of two overlapping single clutches working in parallel.

Reference should now be made to FIG. 5 which shows a second embodiment of the invention in which the clutch is double and features two overlapping clutches 101, 102 as in FIG. 1, but operating in parallel type control instead of in series as before. FIG. 5 only shows the reference numbers which are new or differ from FIG. 1.

As a difference with FIG. 1, piston 3 and disc-set 14 no longer feature alternated radial gaps 3B and 14B set at intervals on their circumference, but piston 3 is provided with splines 3A, and disc-set 14 is engaged in splines 3A and stopped by a snap-ring 25, and no longer engaged in splines 1A of casing 1 and stopped by snap-ring 15. Spring washers 7 and 17, cage 8 and snap-ring 9 are omitted and replaced by a single set of helical springs 27 returning piston 13 against piston 3 and piston 3 against casing 1.

Clutch 101 reacts to pressure PL-P0 and clutch 102 to pressure P2–P0 thus defining a parallel type control of the two clutches, without any other modification. The compensation of centrifugal force is unchanged, the impressive reductions of the inertia as seen by the input shaft remain and the centrifugal forces effectively present are the same as before.

Figure 6:
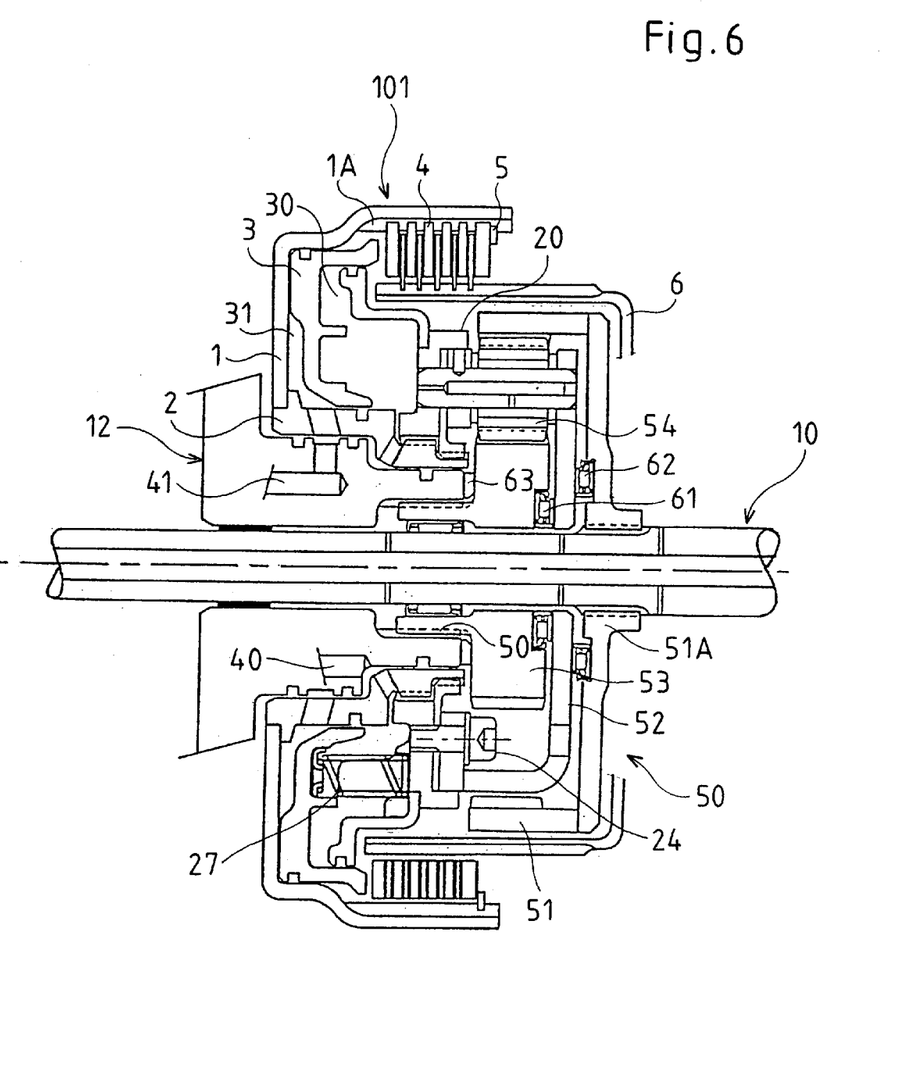
FIG. 6 shows a third embodiment of the invention with a single clutch.

Reference should now be made to FIG. 6 which shows a third embodiment of the invention derived from FIGS. 1 and 5, featuring only one clutch namely 101. All components common to FIGS. 1, 5 and 6 or having the same functions keep the same reference numbers.

As a difference with FIGS. 1 and 5, end partition 20 is directly engaged in piston 3, and helical springs 27 return piston 3 directly against casing 1 without any other modification. All details shown on FIGS. 3 and 4 and relating to FIGS. 1 and 5 are unchanged, the compensation of centrifugal force is unchanged, and all attributes concerning inertia as seen by the input shaft and effectively present centrifugal forces remain.

Figure 7:
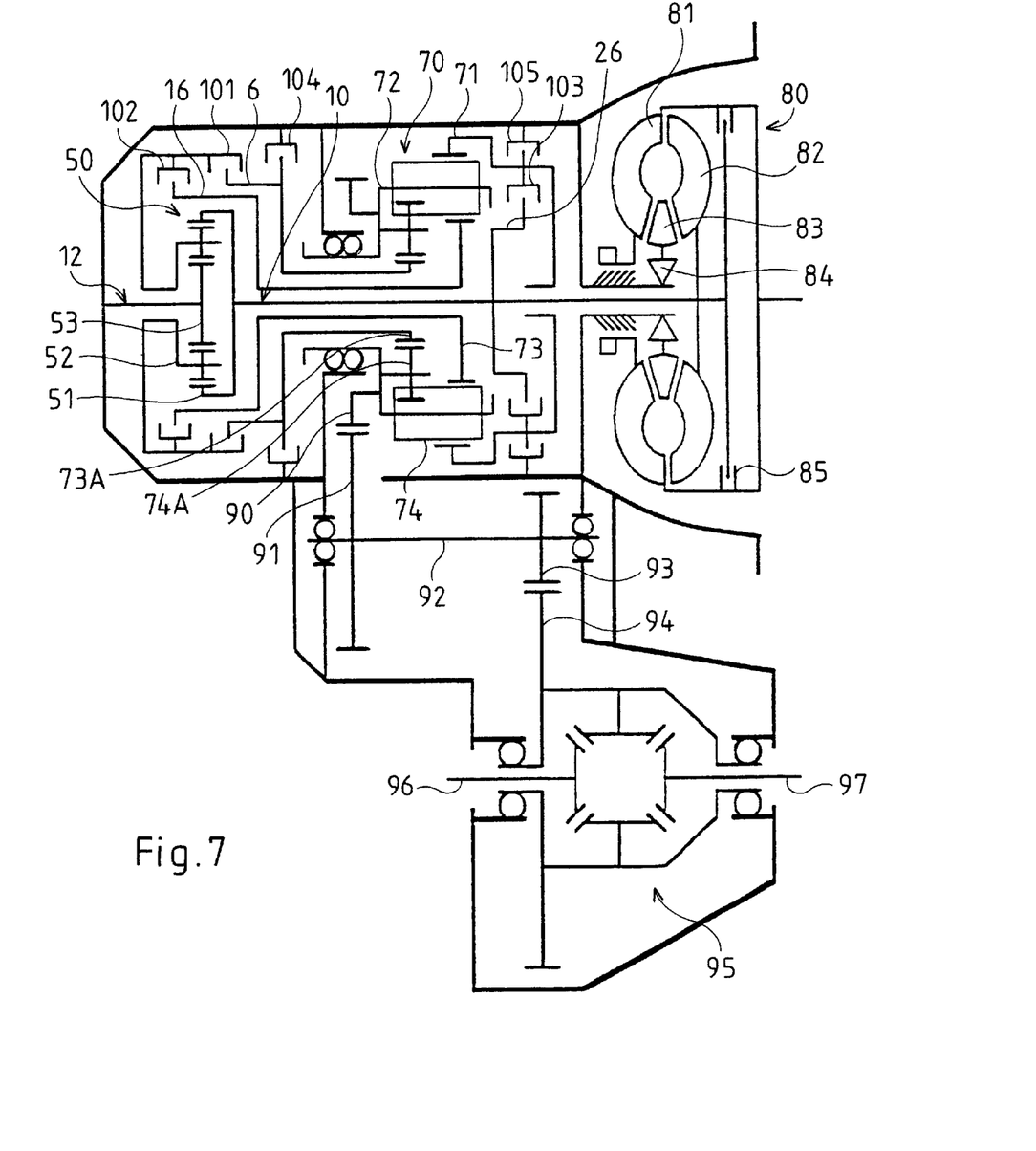
FIG. 7 shows a schematic view of the application of the invention to a vehicle automatic transmission having 5 or 6 forward speeds and 1 reverse speed.

Reference should now be made to FIG. 7 which schematically shows an application of the invention to a vehicle automatic transmission featuring 5 or 6 forward gears and 1 reverse using a double clutch as shown on FIG. 1 or 5, more specifically for front-wheel drive vehicles with transverse engines.

The essential constituents of such a transmission are:

- a four member Ravignaux type planetary gear set 70 comprising a ring gear 71, a planet pinion carrier 72 driving an output gearwheel 90, two sun gears 73 and 73A, and two planet pinion sets: one planet pinion set 74 meshing with ring gear 71 and with sun gear 73, and one planet pinion set 74A meshing with planet pinions 74 and with sun gear 73A;
- a speed reducing double clutch according to FIG. 1 or 5, and for example according to FIG. 1, where can be recognized planetary gear set 50, ring gear 51 driven by input shaft 10, sun gear 53 held stationary in rotation by oil supply bush 12 integral with the transmission case, planet pinion carrier 52 driving the two clutches 101, 102 at reduced speed, and the two friction hubs 6 and 16 driving sun gears 73A and 73;
- a single clutch 103 integral with ring gear 71 to be driven directly at input speed through a friction hub 26 driven by shaft 10;
- brake 104 designed to bring friction hub 6 and sun gear 73A to a stop;
- a brake 105 designed to bring ring gear 71 and clutch 103 to a stop.

In a conventional way, the transmission is in addition supplemented at its input by an hydraulic torque converter 80, comprising an impeller 81 driven by the engine crankshaft, a turbine 82 driving input shaft 10, a stator 83, a free-wheel 84, a lock-up clutch 85, and at its output by two transmission gearwheels on parallel shafts comprising output gearwheel 90 meshing with a gearwheel 91 integral with an intermediate shaft 92, and a pinion 93 integral with intermediate shaft 92 meshing with a gearwheel 94 integral with a differential 95 driving outputs 96 and 97 to the vehicle driving wheels.

The six forward gears and reverse are achieved, the first by tightening clutch 102 and brake 105, the second by tightening clutch 102 and brake 104, the third by tightening clutches 101 and 102, the fourth by tightening clutches 102 and 103, the fifth by tightening clutches 103 and 101, the sixth by tightening clutch 103 and brake 104, and reverse by tightening clutch 101 and brake 105.

The steps from each gear to the next up to the third gear, i.e. first to second, second to third, and first to reverse, are achieved by the Ravigneaux planetary gear set 70 alone, and from the third gear on, i.e. third to fourth, fourth to fifth, and fifth to sixth, by combination of the Ravigneaux gear set 70 with the speed reducing gear set 50.

For use as a five or a six speed unit, it is interesting, in addition to these steps, to consider the overall spread in fifth gear, i.e. first to fifth, and in sixth gear, i.e. first to sixth.

Table 2 below, where the dimension ratios of the speed reducing gear set 50 are identically those of Table 1, shows how very important the variation of this ratio is to the resulting ratio progression and ratio coverage, for example in the case of a Ravigneaux gear set 70 defined by the following numbers of teeth

| | |
|---|---|
| Ring gear 71 | 107 teeth |
| Sun gear 73 | 61 teeth |
| Sun gear 73A | 35 teeth |
| Planet pinions 74 | 23 teeth |
| Planet pinions 74A | 22 teeth |

TABLE 2

| | Sun gear 53/Ring gear 51 ratio | 0.42 | 0.47 | 0.52 | 0.57 | 0.62 |
|---|---|---|---|---|---|---|
| Step ratios | 1-R | 1.34 | 1.34 | 1.34 | 1.34 | 1.34 |
| | 1–2 | 1.75 | 1.75 | 1.75 | 1.75 | 1.75 |
| | 2–3 | 1.57 | 1.57 | 1.57 | 1.57 | 1.57 |
| | 3–4 | 1.27 | 1.30 | 1.33 | 1.36 | 1.40 |
| | 4–5 | 1.28 | 1.30 | 1.33 | 1.36 | 1.38 |
| | 5–6 | 1.30 | 1.29 | 1.27 | 1.26 | 1.25 |
| Ratio coverage | 1–5 | 4.46 | 4.67 | 4.88 | 5.08 | 5.29 |
| | 1–6 | 5.80 | 6.01 | 6.22 | 6.42 | 6.63 |

It is observed that a plurality of ratio progressions is obtained, going from sport oriented close ratios with a short ratio coverage to utility oriented ratios having a wide ratio coverage, not mentioning all the intermediate ratios and ratios coverages commonly used, and it will be understood that this characteristic will be integrally maintained with any Ravigneaux planetary gear set 70 offering different first to second, second to third and first to reverse steps.

Clearly the invention is not limited to the embodiments described and shown for illustrative purposes only, but encompasses any and all variations. In particular, any other proposed specific arrangement making end partition 20 integral in rotation, or in rotation and translation, with rotating oil supply sleeve 2 and with rotating casing 1: for example replacing element 22 in the shape of a nut of end partition 20 by a snap ring, or crimping or welding partition 20 permanently on rotating oil supply 2, will fall within the true spirit and scope of the invention as defined in the appended claims.

What is claimed is:

1. An integrated assembly comprising a hydraulic clutch and a speed reducing planetary gear set, said assembly including, a stationary oil supply bush, a rotating casing integral with an oil supply sleeve, receiving at least one piston, an end partition and at least one set of friction discs for driving at least one friction hub, said assembly also including a speed reducing planetary gear set having a ring gear to be driven by an input shaft, a stationary sun gear and planet pinion carrier, the end partition being fixed for rotation with the oil supply sleeve and with the casing and being driven directly by the planet pinion carrier, the end partition and the piston defining a centrifugal compensation chamber therebetween.

2. An integrated assembly as defined by claim 1, wherein the planet pinion carrier is assembled directly on the end partition and the sun gear is held stationary in rotation directly by the stationary oil supply bush.

3. An integrated assembly as defined by claim 2, wherein the planet pinions rotate on shafts which have extensions fitted in bores in the end partition and contributing in transmitting torque between the planet pinion carrier, the end partition, the oil supply sleeve and the rotating casing.

4. An integrated assembly as defined by claim 1, wherein the shafts of the planet pinions are crossed by longitudinal channels for lubricating the planetary gear set which are parallel to the shafts and open in the centrifugal compensation chamber.

5. An integrated assembly as defined by claim 4, wherein the lubrication channels provided for in the shafts of the planet pinions ensure the lubrication of the planetary gear set as well as the supply of oil to the compensation chamber.

6. An integrated assembly as defined by claim 5, wherein the centrifugal compensation chamber is supplied with oil through channels provided in the stationary oil supply bush and in the oil supply sleeve.

7. An integrated assembly as defined by claim 6, wherein the oil supply channels provided in the stationary oil supply bush and in the oil supply sleeve furnish oil to the compensation chamber as well as lubrication for the planetary gear sets.

8. An integrated assembly as defined by claim 2, wherein the end partition is also fixed for translation with the rotating casing.

9. An integrated assembly as defined by claim 8, wherein the end partition comprises three elements including a first element which defines a hub having splines engaged in corresponding splines of the oil supply sleeve, a second element which defines a nut having a threaded part engaged in a corresponding thread of the oil supply sleeve, and a third element which defines another piston having an oil-tight seal and engaged in the at least one piston.

10. An integrated assembly as defined by claim 9, wherein the first and second elements of the end partition are assembled by screws.

11. An integrated assembly as defined by claim 1, wherein one of the two axial bearings is mounted between the sun gear and the planet pinion carrier, the other of the two axial bearings is mounted between the planet pinion carrier and the ring gear so as to ensure simultaneously the necessary clearances between the sun gear, the planet pinion carrier and the ring gear and the axial position of the integrated assembly.

12. An integrated assembly as defined by claim 11, further comprising an intermediate spacer located between the stationary oil supply bush and the sun gear to adjust the axial position of the integrated assembly.

13. An automatic transmission including an integrated assembly comprising a hydraulic clutch and a speed reducing planetary gear set, said assembly including, a stationary oil supply bush, a rotating casing integral with an oil supply sleeve, receiving at least one piston an end partition and at least one set of friction discs for driving at least one friction hub and said assembly also including a speed reducing planetary gear set having a ring gear to be driven by an input shaft, a stationary sun gear and planet pinion carrier, the end partition being fixed for rotation with the oil supply sleeve and with the casing and being driven directly by the planet pinion carrier.

14. An automatic transmission as defined by claim 13, further comprising another planetary gear set comprising four members including a planet pinion carrier driving an output gearwheel and a sun gear driven by a friction hub, a single clutch integral with ring gear of said other planetary gear set, a brake stopping a friction hub driving one of the sun gears of said other planetary gear set and a brake stopping said ring gear and said single clutch.

* * * * *